United States Patent [19]

Thiel

[11] Patent Number: 4,805,745
[45] Date of Patent: Feb. 21, 1989

[54] SPOT-TYPE DISC BRAKE WITH A RADIALLY ACTING SPRING

[75] Inventor: Rudolf Thiel, Frankfurt am Main, Fed. Rep. of Germany

[73] Assignee: Alfred Teves GmbH, Frankfurt am Main, Fed. Rep. of Germany

[21] Appl. No.: 29,866

[22] Filed: Mar. 23, 1987

[30] Foreign Application Priority Data

Mar. 26, 1986 [DE] Fed. Rep. of Germany ....... 3610104

[51] Int. Cl.[4] ...................... F16D 55/00; F16D 65/40; B60T 11/00
[52] U.S. Cl. .............................. 188/73.31; 188/73.38; 188/370
[58] Field of Search ................. 188/73.1, 73.31, 73.36, 188/73.37, 73.38, 73.39, 73.44, 205 A, 250 B, 250 E, 18 A, 370; 192/30 V, 85 AA, 107 R; 301/6 E, 6 WB

[56] References Cited

U.S. PATENT DOCUMENTS

| 3,958,667 | 5/1976 | De Gennes | 188/73.1 X |
| 4,121,699 | 10/1978 | Tsuruta et al. | 188/73.1 X |
| 4,214,649 | 7/1980 | Fujimori et al. | 188/73.38 |
| 4,509,619 | 4/1985 | Baynes et al. | 188/73.38 X |
| 4,533,025 | 8/1985 | Carre | 188/73.44 |
| 4,609,077 | 9/1986 | Nakatsuhara | 188/73.38 |
| 4,611,693 | 9/1986 | Wang | 188/73.39 X |

FOREIGN PATENT DOCUMENTS

| 2800502 | 7/1978 | Fed. Rep. of Germany . |
| 2804619 | 8/1979 | Fed. Rep. of Germany . |
| 1502016 | 2/1978 | United Kingdom . |
| 2028940 | 3/1980 | United Kingdom . |
| 1565773 | 4/1980 | United Kingdom . |
| 2056602 | 3/1981 | United Kingdom . |
| 2078883 | 1/1982 | United Kingdom . |
| 2163820 | 3/1986 | United Kingdom . |

Primary Examiner—Andres Kashnikow
Assistant Examiner—Robert J. Oberleitner
Attorney, Agent, or Firm—James B. Raden

[57] ABSTRACT

A spot-type disc brake, especially for automotive vehicles, comprises a brake carrier and a brake housing having two radial legs and an interconnecting bridge so as to straddle the rim of a brake disc. Brake pads disposed on either side of the brake disc, with the brake housing being disposed in axially displaceable manner on the brake carrier and actuable by an actuating device. To avoid a screw connection on the outer brake pad, for attaching a brake pad to the adjacent leg of the brake housing, at least one attachment element engages, in a locking manner, ports of the leg and of the brake pad. A spring is secured to the brake pad by way of which the brake pad is resiliently in abutment with bearing points provided on the brake housing.

2 Claims, 4 Drawing Sheets

SPOT-TYPE DISC BRAKE WITH A RADIALLY ACTING SPRING

BACKGROUND OF THE INVENTION

The present invention is concerned with a spot-type disc brake, especially adapted for automotive vehicles.

A disc brake of this type is disclosed in W. German published Patent Application No. P 35 08 039. In disc brakes of this type, the outer brake pad is associated with the actuating means and is screwed to the adjacent outer leg of the brake housing. Sch an arrangement could involve problems, especially at high temperatures, resulting in loosening of the screw connection whereby the safety of the brake is affected.

It is, therefore, an object of the invention to provide a spot-type disc brake wherein a screw connection for the outer pad is eliminated.

SUMMARY OF THE INVENTION

This invention provides for a safe, non-rattling and easy-to-service pad fixation that can be used with so-called internally straddled disc brakes. According to an advantageous form of embodiment of the invention, the brake pad comprises a rear plate provided with at least one axially projecting lug engaging a recess provided in the appertaining leg of the brake housing. Preferably, the lug is of a rectangular configuration and extends in the circumferential direction. By way of that lug, the forces effective during the braking operation in the circumferential direction, are transferred to the brake housing thereby relieving the application of these forces on the securing elements.

The U-shaped continuous port normally provided in the outer leg of some type of brake housings can conveniently be used as the recess.

In accordance with another form of the invention, the recess is so arranged or configurated that the bearing faces of the lug and the recess abut below the surface center of the brake pad, especially below the center line of the brake piston.

According to other advantageous forms of embodiment, the brake pad includes at least one stop especially formed to abut radially outwardly disposed front faces or the face confining the recess thereby attaining a radial fixation of the brake pad. Both the stops and the axially projecting lug can be formed in a simple and practical way by embossing the pad rear plate.

A spring means is comprised of a leaf spring secured to the rear plate of the brake pad. The spring includes a substantially radially extending attachment section and a substantially tangentially extending spring section. The spring section may comprise curved sections of U- or S-shaped configuration.

According to other advantageous embodiments, the end sections of the leaf spring can be supported on radially outwardly disposed front faces of the corresponding leg of the brake housing or on bearing faces of the leg extending essentially in parallel to the rear plate. These bearing faces can be easily formed as depressions.

BRIEF DESCRIPTION OF THE DRAWING

Further examples of embodiment of the invention are illustrated in the drawing and will be described in the following, wherein.

DETAILED DESCRIPTION OF A PREFERRED EMBODIMENTS

Figure 1:
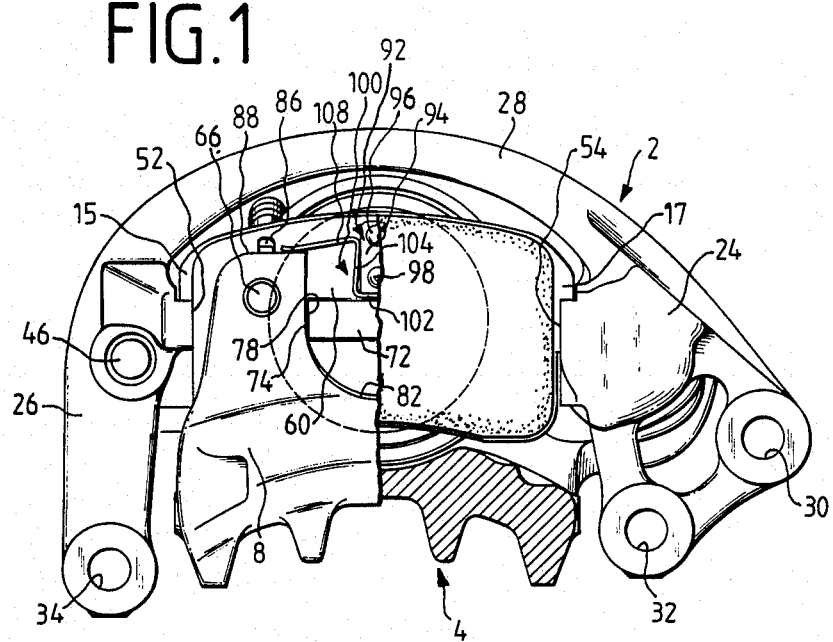
FIG. 1 shows an internally straddled spot-type disc brake, viewed from the outer side of the automotive vehicle.
Figure 4:
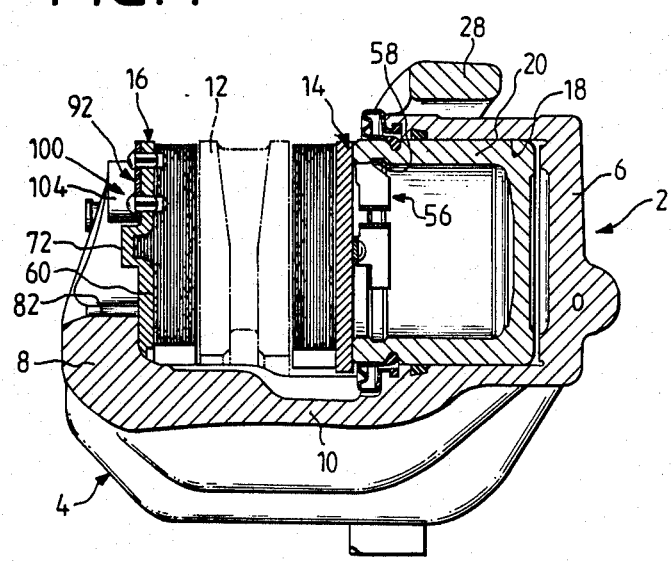
FIG. 4 shows a longitudinal section through the disc brake.
Figure 2:
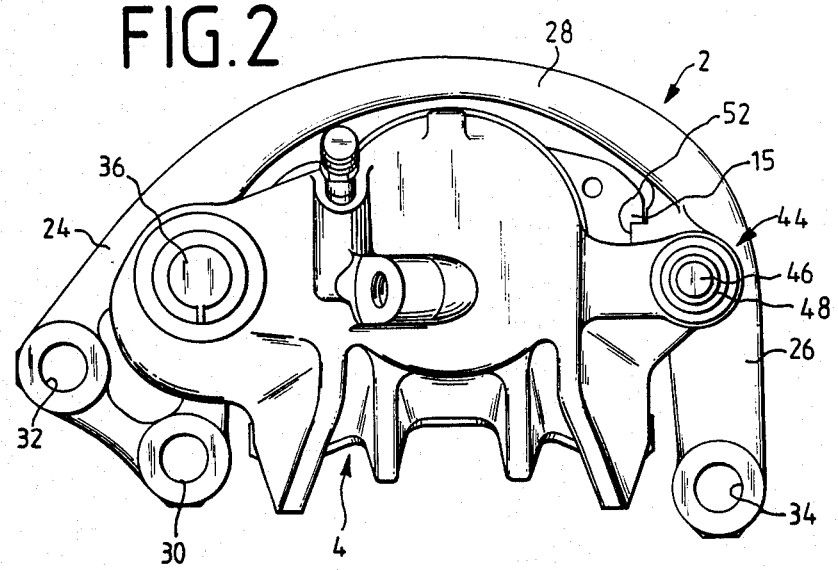
FIG. 2 shows the disc brake of FIG. 1, viewed from the inner side of the automotive vehicle.

Reference is made to a first embodiment of an internally straddled disc brake 2 as shown in FIGS. 1 to 4. The internally straddled disc brake 2 comprises a brake housing 4 which, in longitudinal section, is of a substantially U-shaped configuration. It comprises radially outwardly extending legs 6, 8 interconnected via a bridge portion 10. The housing 4 is arranged so that the legs 6 and 8 straddle a brake disc 12 (shown in broken lines). Located on either side of the brake disc 12 are brake pads 14, 16 also straddled by the U-shaped brake housing 4 so that the legs 6 and 8 are adjacent brake pads 14 and 16, respectively.

For applying the disc brake, the internally disposed leg 6 includes an actuating means comprising a cylindrical bore 18 and a piston 20 axially disposed therein. Piston 20 applies force to the internally disposed brake pad 14 directly, in response to which the brake housing 4 is displaced inwardly in the opposite direction thereby applying force to the externally disposed brake pad 16. For this, brake housing 4 is axially displaceably disposed on a stationary brake carrier 22. Brake carrier 22 includes two brake carrier arms 24, 26 interconnected via a connecting stem 28 such that the brake carrier 22, generally, is of an arc-shaped configuration.

Brake carrier 22 is connected to a steering knuckle (not shown) of an automotive vehicle, for which purpose, it includes three attachment points. The points of attachment are configurated as bores 30, 32, 34, with two bores 30, 32 disposed—viewed in the direction of the main rotation—at the inlet side, whereas the third bore 34 is provided on the brake carrier arm on the outlet side. The internally disposed bore 32 is located on substantially the same radius as bore 34. Bores corresponding to bores 30, 32, 34 provided on brake carrier 22 are provided in the steering knuckle such that the brake carrier 22 can be connected to the steering knuckle by means of screws.

For disposing the brake housing 4 on brake carrier 22 in axially displaceable manner, a supporting bolt 36 is provided which is rigidly disposed in a bore of the brake housing 4. The supporting bolt 36 forms a free end protruding from the bore to form a guide face cooperating with a guide bore provided in the brake carrier. To protect the guide face, a protective cap 42 is provided between the eye 38 of the brake carrier containing the bore and the eye 40 of the brake housing 2 containing the bore for attaching the support bolt.

Provided on the side, which—viewed in the direction of the main rotation—is the outlet side, is a means 44 to absorb the moments occurring about the support bolt 36 during the braking operation. The means 44 includes a short-length bolt 46 which is fixed in the brake carrier arm 26 and which extends away from the brake disc in parallel to the support bolt 36. Bolt 46 engages a bore 48 provided in the brake housing 4. The diameters of bore 48 and bolt 46 are so dimensioned that a free annular space remains between the two. Seated in the said annular space, is a flexible sleeve 47 to attenuate the movements of the bolt 46 in the bore 48 that occur during the braking operation.

Figure 3:
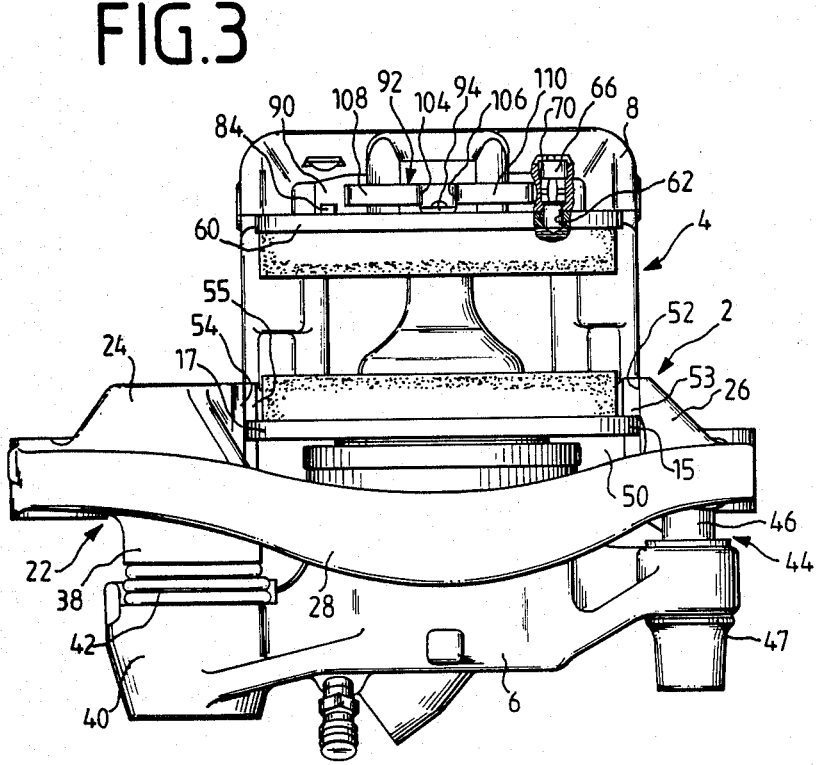
FIG. 3 is a plan view of the disc brake as shown in FIGS. 1 and 2.

To support the inwardly disposed brake pad 14 in the brake carrier 22, the latter forms a cavity 50 which, in the circumferential direction, is confined by supporting faces 52, 54. The suporting faces 52, 54 are provided in the area of the supporting bolt 36 and of the bolt 46. To hold the internal brake pad 14 in the radial direction, the same is provided with shoulders and lugs 15, 17, respectively, bearing on corresponding support faces 53, 55 of the brake carrier. A spring 56 is provided on the rear plate of the brake pad 14 which engages the interior of the piston 20 to click into an annular groove 58. To hold the outer brake pad 16, the same is provided, in the rear plate 60 thereof, with two bores 62 engaged by pins 66 (FIG. 3 shows only one of them) disposed symmetrically to the center line and secured in the outer leg 8. For this purpose, leg 8 is provided with corresponding bores 70 of which FIG. 3 shows but one. Pins 66 engage, with clearance, bores 62. Formed on the rear plate 60 of brake pad 16 is an axialy protruding lug 72 which, in this instance, is made by deforming the rear plate. Lug 72 substantially is of a rectangular configuration and extends at the level of the support faces 52, 54 in the circumferential direction. It comprises lateral bearing faces 74 (of which FIG. 1 shows but one) cooperating on lateral confining faces 78 of a U-shaped recess 82 provided in the outer leg 8. The lateral confining faces 78 of the U-shaped recess 82 are extended radially inwardly to such an extent that lug 72 will get into abutting relationship with the bearing faces 74 also below the center (e.g. 4 to 6 mm) so that, on the one hand, the surface pressure can be accommodated and, on the other hand, the support in the point of attack of the circumferential force is effected thereby precluding a torque on the plate.

Moreover, provided on the rear plate 60, are two stops 84, 86 that axially protrude and that can easily be made by deformation of the rear plate. These stops 84, 86 cooperate with radially outwardly disposed front faces 88, 90 formed on the outer leg 8 in side-by-side relationship with the U-shaped recess 82. To attain a defined clearance between stops 84, 86 and front faces 88, 90, the front faces are machined by means of milling cutters. In another form of embodiment (not shown) a central stop can be provided in place of stops 84, 86, which cooperates with the bottommost point of the U-shaped recess, thereby eliminating machining of the front faces provided that the spring arms are so configured as to be able to accommodate the major casting tolerances.

In addition, a leaf spring 92 is secured to the rear plate 60. The leaf spring 92 comprises a substantially radially extending attachment section 94. The attachment section 94 is of a rectangular configuration and is provided with two bores through which rivets 96, 98 can be used. The attachment can also be effected by one rivet, or by a screw or the like. The attachment section 94 passes over into an spring section 100 of substantially tangential orientation. The faces of the said spring section 100 are substantially vertical to the rear plate face. The spring section 100 comprises a central section 102 which is directly adjacent the attachment section 94 and only negligibly wider than the latter. Substantially radially extending sections 104, 106 then follow. These sections pass over into end sections 108, 110 extending in substantially tangential direction, the free ends of which resiliently lying on the front faces 88, 90 of the leg 8. This will result in a radially outwardly acting spring force so that the brake pad 60 is clamped against pins 66, with the effective clamping force of the spring forcing the bottom edge of the bore provided in the rear plate against pins 66. The clearance of the bore is thereby placed to zero, thereby permitting relatively large manufacturing tolerances and nevertheless safeguarding a rattle-free support. In a preferred form of embodiment, the carrier plate 60 is provided with an embossment engaging the bores of the pins 66. At the same time, the stops 84, 86 are lifted from the front faces 88, 90 by a corresponding amount.

Figure 5:
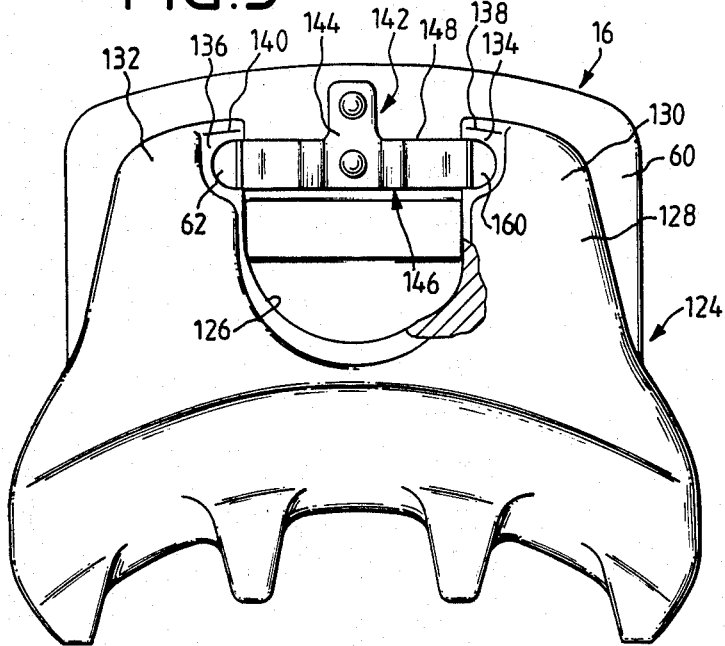
FIG. 5 shows an alternative form of embodiment of a disc brake, viewed from the outer side.
Figure 6:
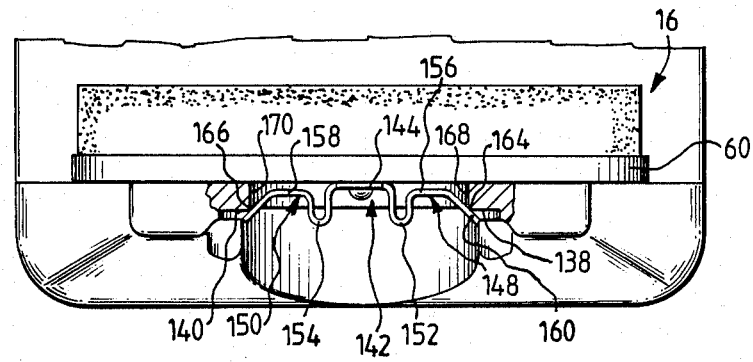
FIG. 6 is a partial plan view of the disc brake according to FIG. 5.

FIGS. 5 and 6 show another form of embodiment of a spot-type disc brake. The shape of the brake housing 124 of this disc brake substantially corresponds to that of the brake housing 4. As opposed to the latter, the brake housing 124 includes a U-shaped recess 126 on the outer leg 128 wherein the two leg sections 130, 132 are formed with depressions 134, 136 on the outer side adjacent the U-shaped recess 126. The depressions 134, 136 include faces 138, 140 extending in parallel to the rear plate 60 of the brake pad 16. The brake pad 16, in that instance, is provided with another leaf spring 142 comprising an attachment section 144 of substantially rectangular configuration which extends radially and a spring section 146 extending in the circumferential direction. The spring section 146 forms two spring arms 148, 150 forming resilient sections 152, 154 of U-shaped configuration adjacent the attachment section. The resilient sections 152, 154 pass over into sections 156, 158 extending in parallel to the rear plate, with the said sections 156, 158 terminating in end sections 160, 162 extending at an acute angle to the rear plate. The leaf spring 142, with these end sections is in abutment with edges 164, 166 that are formed by the faces 138, 140 and the confining faces 168, 170 extending vertical thereto, of the U-shaped recess 126.

Figure 7:
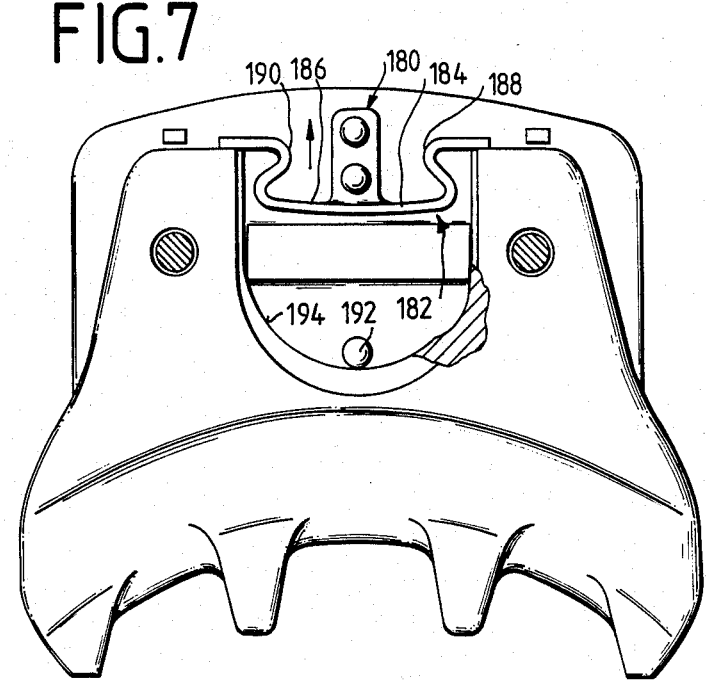
FIG. 7 shows another form of embodiment of a disc brake, viewed from the outer side of the automotive vehicle.
Figure 8:
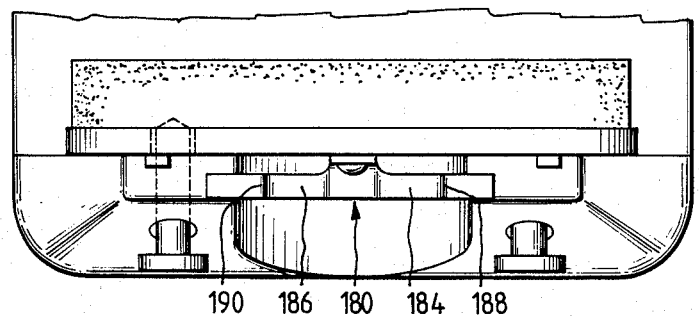
FIG. 8 is a partial plan view of the disc brake as shown in FIG. 7.

A third form of embodiment of a disc brake is shown by FIGS. 7 and 8. In that form of embodiment, a leaf spring 180 is provided having a spring section 182 which substantially extends in the vertical direction and forms two spring arms 184, 186 comprising resilient sections 188, 190 of S-shaped configuration In that embodiment, a central nap 192 is provided serving as a stop for a mounting aid, which nap cooperates with the section of the U-shaped recess 194 which, radially, is the innermost section.

What is claimed is:

1. A spot-type disc brake for automotive vehicles comprising a brake carrier, a brake housing having two radial legs and an interconnecting bridge portion for straddling the rim of a brake disc and brake pads located in the housing adjacent the legs so as to be on either side of the brake disc, the brake housing being disposed in axially displaceable manner on the brake carrier and actuating means for actuating said brake, means for attaching one of said brake pads to the adjacent leg of the brake housing, said attaching means including at least one rigid attachment element engaging openings in the leg and in said one brake pad and a spring means fixedly secured to the brake pad is provided for bracing the brake pad in resilient abutment radially outward with bearing points provided on the brake housing, wherein the brake pad comprises at least one stop effective in the radial direction, and wherein the stop is formed for abutment with radially outwardly disposed front faces of said adjacent leg of said brake housing.

2. A spot-type disc brake for automotive vehicles comprising a brake carrier, a brake housing having two radial legs and an interconnecting bridge portion for straddling the rim of a brake disc and brake pads located in the housing adjacent the legs so as to be on either side of the brake disc, the brake housing being disposed in axially displaceable manner on the brake carrier and actuating means for actuating said brake, means for attaching one of said brake pads to the adjacent leg of the brake housing, said attaching means including at least one rigid attachment element engaging openings in the leg and in said one brake pad and a spring means fixedly secured to the brake pad is provided for bracing the brake pad in resilient abutment radially outward with bearing points provided on the brake housing, wherein the spring means is formed by a leaf spring secured to a rear plate of the brake pad, and, wherein end sections of the leaf spring are supported on radially outwardly disposed front faces of the adjacent leg of the brake housing.

* * * * *